Figure 1:
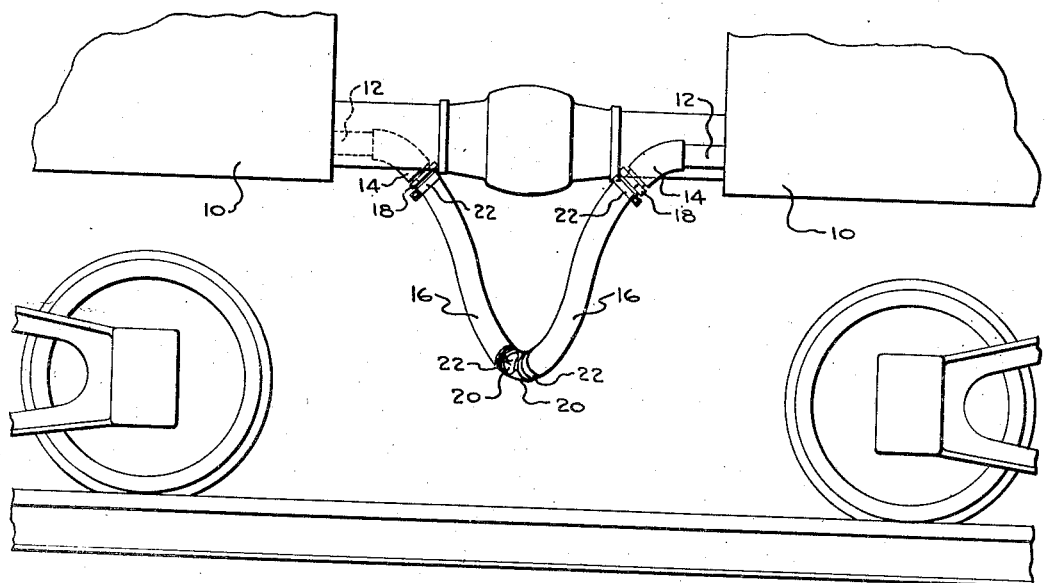

May 14, 1940.  J. H. PHILLIPS  2,200,967
HOSE CONSTRUCTION
Filed Feb. 10, 1938  2 Sheets-Sheet 1

Inventor
JOHN H. PHILLIPS
By Beaman & Langford
Attorney

Inventor
JOHN H. PHILLIPS
By Beaman & Langford
Attorney

Patented May 14, 1940

2,200,967

UNITED STATES PATENT OFFICE 2,200,967

HOSE CONSTRUCTION

John H. Phillips, Jackson, Mich.

Application February 10, 1938, Serial No. 189,831

2 Claims. (Cl. 138—55)

The present invention relates to improvements in the reinforcement and strengthening of flexible and extensible conduits, having particular reference to rubber air hose used upon railroad cars.

For some time it has been the practice to use an air hose coupling upon railroad cars capable of being pulled apart at the time the cars are uncoupled. When two cars are coupled, the air hose connections, upon being coupled, freely hang in a relatively loose arc between the cars. At the time the cars are uncoupled and separated, the hose connections are in a sense straightened out and remain coupled until the endwise strain becomes sufficient to part the coupling. It is an admitted fact that this method of uncoupling is detrimental to the hose connections and materially shortens the life thereof. In order to get any sort of satisfactory service out of the hose connections, it has been found necessary to materially increase the weight of the hose so as to withstand this drastic manner of uncoupling.

Through the present invention it is proposed to reinforce the hose connection in the manner whereby the major portion of the endwise strain is removed from the hose proper, thus materially increasing the life of the hose connection and permitting, if desired, reduction in the weight of the hose construction over present specifications. This is preferably accomplished through the use of a suitable reinforcing member of flexible yet relatively non-extensible material compared with the hose connection. In most cases it will be further desirable to place this reinforcing and strengthening member along the lower side of the hose as it is used in service.

In several of the illustrated forms of the invention the reinforcing and strengthening member is embedded in the hose construction proper, which is usually fabricated as a laminated structure of rubber and fabric built up to give the desired wall thickness. In another form of the invention the reinforcing and strengthening member is positioned exteriorly of the hose construction and anchored at opposite ends of the hose coupling structure.

Thus, one of the objects of the invention is to provide an improved hose connection for railroad cars having a longitudinally extending reinforcing and strengthening member positioned along the under side of the hose to relieve the same from uncoupling strains.

A further object is to provide a hose construction of the type described, in which a reinforcing and strengthening member is embedded in the hose construction and anchored at opposite ends of the hose connection so as to relieve the hose connection from endwise strain.

A further object resides in a hose construction of the type described, in which a relatively flat and non-extensible member is associated along one side of the hose connection so as to remove stresses and strains from the hose construction proper.

A still further object of the invention is to provide an air hose of the type used on railroad cars having a reinforcing member located along the under side of the hose when in service so as to be capable of absorbing the endwise stresses resulting from uncoupling of the cars.

A still further object of the invention is to provide a flexible, longitudinally extensible hose section with a relatively non-extensible, longitudinally extending, reinforcing and strengthening member capable of being anchored at the ends of the hose section, whereby endwise tension and stresses are taken by the reinforcing member and removed from the hose construction.

Figure 2:
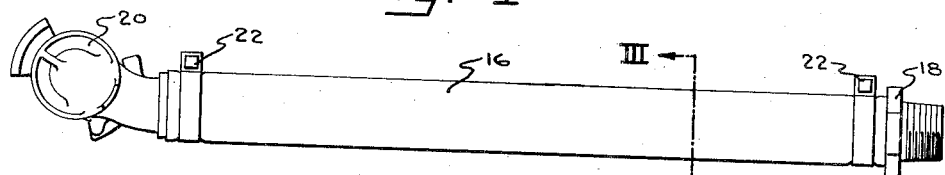
Figures 3, 5:
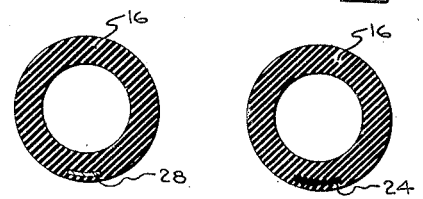
Figure 4:
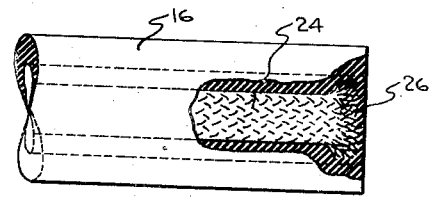
Figure 6:
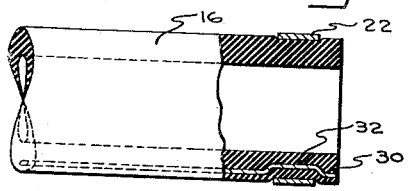
Figure 7:
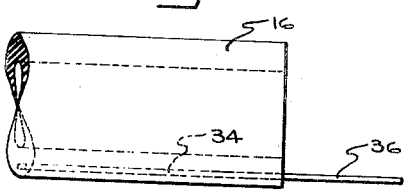
Figure 8:
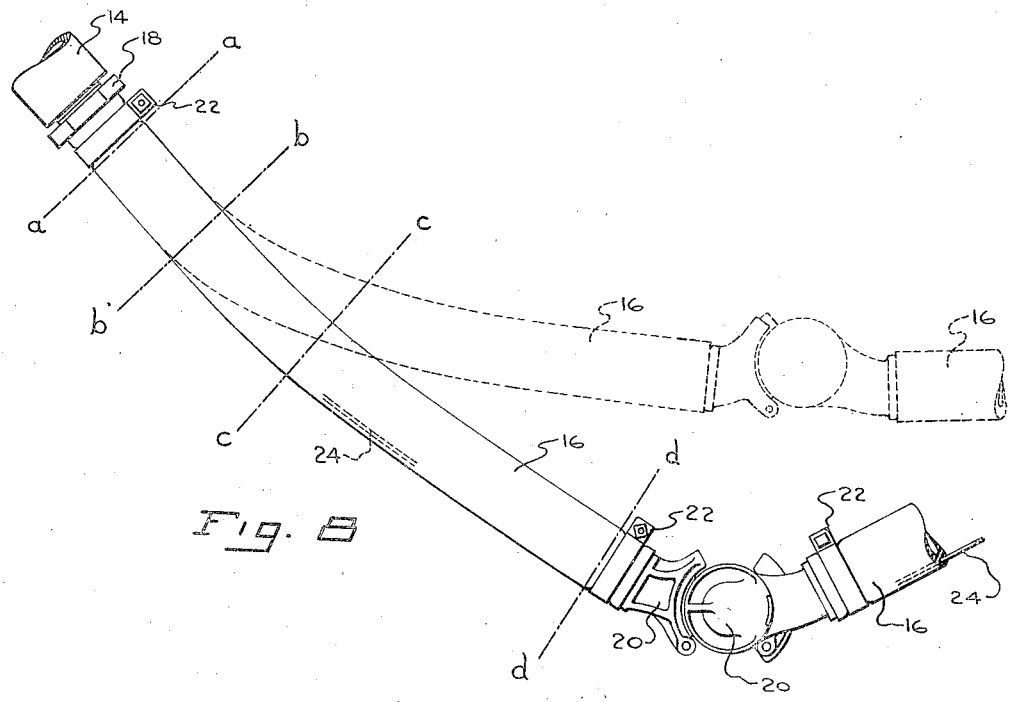
Figure 9:
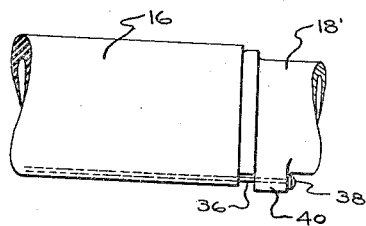
Figure 10:
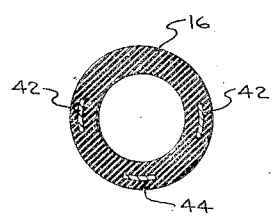

These and other objects and advantages of the present invention residing in the arrangement, construction and combination of parts will be found to be set forth in detail in the following description and illustrated in the accompanying drawings, wherein Fig. 1 is a side elevational view of two railroad cars coupled together, showing the air hoses likewise coupled, Fig. 2 is a side elevational view of a hose connection of standard construction, embodying the present invention, Fig. 3 is a cross-sectional view taken on line III—III of Fig. 2, showing the reinforcing member in the lower side of the hose, Fig. 4 is a side elevational view of the hose construction shown in Fig. 2, with the clamp removed and showing the flared end of the reinforcing member, Fig. 5 is a cross-sectional view similar to Fig. 3 of a flat metal ribbon used as a reinforcing member, Fig. 6 shows another arrangement for securely anchoring the reinforcing member at the end of the hose section through a hose clamp, Fig. 7 is a side elevational view of a hose section, showing the reinforcing member projecting beyond the end for attachment purposes, Fig. 8 illustrates the manner in which the hose connections straighten out upon uncoupling and separation of the cars, Fig. 9 shows one manner in which the construction shown in Fig. 7 may be anchored to the hose coupling, Fig. 10 shows another arrangement of the reinforcing structure in which reinforcing members are provided along the vertical opposite sides, as well as along the lower side, of the hose.

Referring particularly to Fig. 1, railroad cars 10 are illustrated coupled together, with the air connections 12 having angular portions to which the hose sections 16 are coupled through suitable hose couplings 18, the hose sections 16 being connected to one another through a coupling 20 of well-known construction. Suitable clamps 22 are shown for anchoring the hose sections 16 to the hose couplings located at their opposite ends.

In Fig. 8 the full line position is intended to represent the manner in which the hose sections 16 normally hang while in service with the cars coupled together. The hose section 16 is relatively stiff, and its inherent tendency is to assume a straight position. When coupled, that portion of the section between the planes a—a and b—b is relatively straight because of the rigid angular portion 14 to which it is connected, the remaining portion of the section between the planes b—b and d—d assuming the same general curvilinearity when coupled, as will appear from the full line representation in Fig. 8. However, at the time the cars are uncoupled and commence to separate, the coupled hose section in one sense might be referred to as straightening out in moving toward the dotted line position shown in Fig. 8. However, in so doing, that portion of the hose section between the planes b—b and c—c becomes more curvilinear than before, with the result that in addition to the longitudinal stress placed upon the hose section in general, that portion of the hose between the planes b—b and c—c is compressed along the upper side and materially extended along the lower side. From this it will appear that the endwise tensioning of the hose connections to uncouple the same has a very detrimental action upon the entire hose section and particularly that section located between the planes b—b and c—c. In practice, it will be understood that the extent to which the sections 16 are straightened out and elevated depends entirely upon the amount of endwise stress that is required to break apart the couplings 20. Because of the manner in which the hose sections are hung and the fact that there is a decided tendency for the under side of the hose to stretch between the planes b—b and c—c, I have found that if a relatively non-extensible reinforcing member is disposed along the under side of the hose section, such a reinforcing member will relieve the hose section itself from the endwise tensioning required to separate the couplings 20.

Accordingly, in Figs. 3 and 4 I have shown a narrow multi-strand reinforcing member 24, which may be of braided, twisted or otherwise suitably arranged wire filaments embedded in the hose section 16, extending longitudinally thereof along the under side. The member 24 is preferably embedded beneath the last few laminations of rubber and fabric, from which the hose sections of the type under consideration are usually fabricated.

In Fig. 4 the individual strands of the member 14 are shown flared and somewhat unraveled or disarranged at the outer end 26 so as to enable the clamp 22 to more effectively anchor the opposite ends of the member 24 to the couplings 18 and 20. The member 24 is disposed along the under side of the hose section 16 and is of the same length as the hose sections 16 when in the straight condition illustrated in Fig. 2. When the hose sections 16 are straightened out into the dotted line position shown in Fig. 8, that portion of the hose section between the planes b—b and c—c is sharply curved. This tensioning and deflection of the hose will bring the reinforcing member 24 into action and at least relieve the hose section from all substantial extension due to the endwise load to which it is subjected. It should be quite apparent that if the reinforcement were positioned along the upper side of the hose section, it would have no such effect upon the hose connection in assuming the dotted line position shown in Fig. 8, for the reason that for the most part the upper side of the hose section would be under compression.

In Fig. 5 a narrow metallic band 28 is shown employed as a reinforcing member in lieu of the multi-strand member 24. The function, however, of both members 24 and 28 is identical.

In Fig. 6 the reinforcing member 30, which may be either of the type of the member 24 or of the member 28 or some other suitable type, is shown sharply deflected at 32 so as to constitute a better anchorage between the reinforcing member 30 and the clamp 22 when the latter is drawn up. In practice, the deflection 32 could be made prior to incorporation into the hose section or could be done by any suitable means after being incorporated as a straight member.

In Fig. 7 the reinforcing member 34 is illustrated as having an end portion 36 extending beyond the end of the hose section. The end portion 36 may be bent back and anchored to the clamp 22 in any suitable manner or anchored to a suitable coupling in the manner shown in Fig. 9 by upsetting the end 36, as at 38, after passing the same through an eye 40 in the coupling 18'. Numerous other methods may be devised for anchoring the end 36, as should be well appreciated.

In lieu of a single reinforcing member, in some cases it may be desirable to incorporate into the hose connection 16 a plurality of reinforcing members 42 and 44 located along the vertical and lower sides. With such an arrangement the reinforcing member 44 would be particularly subjected to longitudinal tensioning resulting from a tendency for the hose sections 16 to be sharply curved upon straightening out between the planes b—b and c—c, while the opposed members 42, being disposed along the neutral axes, would readily absorb any endwise tensioning resulting from the direct endwise pull upon the hose connections 16.

I wish to have it clearly understood that the various illustrated forms of the present invention are only for the purpose of illustrating the broad principles of the same and not for the purpose of restricting the invention to the specific forms shown and described. It is anticipated that reinforcing members other than those fabricated from or made up of metal may be incorporated in the hose construction proper and impart thereto the desired reinforcement and strengthening.

It is the purpose of the present invention to materially strengthen and increase the useful life of hose sections, particularly of the specific type described, without any material increase in the cost of the construction, and perhaps even at a lower cost of construction through the ability to use lighter hose sections. Accordingly, I wish to broadly claim the conception of reinforcing an extensible hose section with a suitable reinforcing member along a portion or portions thereof, which will have the effect, during normal or abnormal conditions of use, of relieving the hose section proper from detrimental extension and elongation.

Having thus described my invention, what I desire to secure by Letters Patent and claim is:

1. In air hose and coupling construction for railroad cars of the type which, when in coupled relation, loosely hang in an arc between adjacent coupled cars, hose sections of flexible extensible material each having a relatively narrow non-extensible reinforcing member embedded in the wall thereof adjacent the exterior surface of each hose section, said members being along the side of greatest arc and being under tension with the hose hung at an arc as in use.

2. In air hose and coupling construction for railroad cars of the type which, when in coupled relation, loosely hang in an arc between adjacent coupled cars, hose sections of flexible extensible material each having a relatively narrow non-extensible reinforcing member embedded in the body of each of said hose sections adjacent the exterior surface of each hose section, said members being along the side of greatest arc and being under tension with the hose hung at an arc as in use, and anchorages for opposite ends of said member for transferring endwise strain through the coupling structure and said members without material extension of the hose section.

JOHN H. PHILLIPS.